United States Patent
Caughey

(10) Patent No.: US 7,228,335 B2
(45) Date of Patent: Jun. 5, 2007

(54) METHOD OF AUTOMATICALLY POPULATING CONTACT INFORMATION FIELDS FOR A NEW CONTRACT ADDED TO AN ELECTRONIC CONTACT DATABASE

(75) Inventor: David A. Caughey, Ottawa (CA)

(73) Assignee: GoodContacts Research Ltd., Ottawa, Ontario (CA)

(*) Notice: Subject to any disclaimer, the term of this patent is extended or adjusted under 35 U.S.C. 154(b) by 688 days.

(21) Appl. No.: 10/076,440

(22) Filed: Feb. 19, 2002

(65) Prior Publication Data

US 2003/0158860 A1    Aug. 21, 2003

(51) Int. Cl.
*G06F 15/16* (2006.01)

(52) U.S. Cl. ........................ 709/206; 709/217

(58) Field of Classification Search ............ 709/206; 707/104.1; 705/1
See application file for complete search history.

(56) References Cited

U.S. PATENT DOCUMENTS

| | | | |
|---|---|---|---|
| 5,293,256 A | | 3/1994 | Fukushima et al. |
| 5,559,867 A | | 9/1996 | Langsenkamp et al. |
| 5,737,726 A | * | 4/1998 | Cameron et al. ............. 705/7 |
| 5,740,230 A | | 4/1998 | Vaudreuil |
| 5,813,006 A | * | 9/1998 | Polnerow et al. ............. 707/10 |
| 5,903,845 A | * | 5/1999 | Buhrmann et al. ......... 455/461 |
| 5,933,778 A | * | 8/1999 | Buhrmann et al. ......... 455/461 |
| 5,963,951 A | * | 10/1999 | Collins ....................... 707/102 |
| 5,999,932 A | | 12/1999 | Paul |
| 6,009,149 A | | 12/1999 | Langsenkamp |
| 6,023,700 A | | 2/2000 | Owens et al. |
| 6,047,327 A | | 4/2000 | Tso et al. |
| 6,049,801 A | | 4/2000 | Whitmyer, Jr. |
| 6,157,954 A | | 12/2000 | Moon et al. |
| 6,185,551 B1 | * | 2/2001 | Birrell et al. ................. 707/3 |
| 6,195,686 B1 | | 2/2001 | Moon et al. |
| 6,247,043 B1 | | 6/2001 | Bates et al. |
| 6,249,805 B1 | * | 6/2001 | Fleming, III ............... 709/206 |
| 6,269,369 B1 | * | 7/2001 | Robertson ................... 707/10 |
| 6,373,940 B2 | | 4/2002 | Shaffer et al. |

(Continued)

FOREIGN PATENT DOCUMENTS

EP    0 927 945 A2    7/1999

(Continued)

OTHER PUBLICATIONS

Robert J. Hall "INFOMOD: a knowledge-based moderator for electronic mail help lists", conference on information and knowledge management proceedings of the fifth international conference on information and knowledge management, pp. 107-114.

(Continued)

*Primary Examiner*—Beatriz Prieto
*Assistant Examiner*—Benjamin Ailes
(74) *Attorney, Agent, or Firm*—Freedman & Associates

(57) ABSTRACT

Automatically populating contact information fields of a contact information database, such as for instance an electronic address book is performed without requiring an individual to manually enter data for the contact. A message is sent to the newly added contact requesting that they fill in their contact information. When the individual is a member of a service filling in the contact information is automatable.

14 Claims, 8 Drawing Sheets

U.S. PATENT DOCUMENTS

| | | | |
|---|---|---|---|
| 6,374,259 B1 * | 4/2002 | Celik | 707/104.1 |
| 6,404,884 B1 | 6/2002 | Marwell et al. | |
| 6,405,243 B1 * | 6/2002 | Nielsen | 709/206 |
| 6,405,319 B1 | 6/2002 | Arnold et al. | |
| 6,427,164 B1 | 7/2002 | Reilly | |
| 6,442,241 B1 | 8/2002 | Tsumpes | |
| 6,457,012 B1 | 9/2002 | Jatkowski | |
| 6,529,723 B1 | 3/2003 | Bentley | |
| 6,546,416 B1 | 4/2003 | Kirsch | |
| 6,564,264 B1 | 5/2003 | Creswell et al. | |
| 6,615,241 B1 | 9/2003 | Miller et al. | |
| 6,694,353 B2 | 2/2004 | Sommerer | |
| 6,701,348 B2 * | 3/2004 | Sommerer | 709/206 |
| 6,760,727 B1 * | 7/2004 | Schroeder et al. | 707/10 |
| 6,791,050 B2 | 9/2004 | Daniels, Jr. et al. | |
| 6,829,348 B1 | 12/2004 | Schroeder et al. | |
| 6,839,737 B1 * | 1/2005 | Friskel | 709/206 |
| 6,883,000 B1 * | 4/2005 | Gropper | 707/10 |
| 6,895,426 B1 * | 5/2005 | Cortright et al. | 709/206 |
| 6,952,805 B1 * | 10/2005 | Tafoya et al. | 715/739 |
| 7,054,886 B2 * | 5/2006 | Stern et al. | 707/104.1 |
| 2001/0032089 A1 * | 10/2001 | Schiller | 705/1 |
| 2002/0007400 A1 * | 1/2002 | Pedersen | 709/206 |
| 2002/0010747 A1 | 1/2002 | Jaehyuk-Hwang | |
| 2002/0016857 A1 * | 2/2002 | Harari | 709/238 |
| 2002/0049610 A1 | 4/2002 | Gropper | |
| 2002/0052841 A1 | 5/2002 | Guthrie et al. | |
| 2002/0052921 A1 | 5/2002 | Morkel | |
| 2002/0103932 A1 * | 8/2002 | Bilbrey et al. | 709/245 |
| 2002/0107925 A1 | 8/2002 | Goldschneider et al. | |
| 2002/0124057 A1 | 9/2002 | Besprosvan | |
| 2002/0169748 A1 * | 11/2002 | Macholda | 707/1 |
| 2003/0069874 A1 | 4/2003 | Hertzog et al. | |
| 2003/0212745 A1 | 11/2003 | Caughey | |
| 2004/0015554 A1 | 1/2004 | Wilson | |
| 2004/0039779 A1 | 2/2004 | Armstrong et al. | |
| 2004/0054734 A1 | 3/2004 | Gilbert | |
| 2005/0010799 A1 | 1/2005 | Kelley et al. | |
| 2005/0060638 A1 | 3/2005 | Mathew et al. | |

FOREIGN PATENT DOCUMENTS

| | | |
|---|---|---|
| WO | WO 00/67105 | 11/2000 |
| WO | WO 00/67108 | 11/2000 |
| WO | WO 00/67416 | 11/2000 |
| WO | WO 01/06497 A2 | 1/2001 |
| WO | WO 01/33430 A1 | 5/2001 |
| WO | WO 01/59595 | 8/2001 |

OTHER PUBLICATIONS

GoodContacts.com Inc., GoodContacts: How it Works, Sep. 24, 2001, GoodContacts.com.

GoodContacts.com Inc., GoodContacts: Questions and Answers, Sep. 24, 2001, GoodContacts.com.

* cited by examiner

Figure 3
(prior art)

METHOD OF AUTOMATICALLY POPULATING CONTACT INFORMATION FIELDS FOR A NEW CONTRACT ADDED TO AN ELECTRONIC CONTACT DATABASE

FIELD OF THE INVENTION

The instant invention relates to a method of populating contact information fields for a newly added contact within a contact database and more particularly to an automated method of populating the contact information fields without requiring an individual to manually enter data in same.

BACKGROUND OF THE INVENTION

Electronic messaging has dramatically changed the manner in which people communicate with one another in the digital age. Electronic messaging systems, for example, permit users on different computers to communicate with one another by transmitting information such as text messages and the like between the different computers. Electronic messaging is often used to permit employees in a company to communicate with other employees connected to the company's internal network, regardless of whether they are in the same or another company facility. Also, due to the explosive growth of the Internet, electronic messaging has now become a relatively common way for anyone with a computer to communicate with other computer users all over the world.

In most electronic messaging systems, users are assigned user identifiers, or "user id's" that uniquely identify each user. Furthermore, each user is typically assigned one or more "mailboxes," (also referred to as "post office boxes") that have a unique address so that any user wishing to send an electronic message (often referred to as an "e-mail") to another user can do so by addressing the electronic message to the mailbox assigned to that user.

Many electronic messaging systems furthermore keep electronic "address books," which typically include contact information databases within which are stored records of the mailbox addresses for different users. Therefore, for example, a user wishing to send an electronic message to a user named John Smith, whose mailbox address is "smithj@xyz.com", is then able to search through an address book to find an entry for "Smith, John", rather than having to remember a relatively cryptic mailbox address that is assigned to that user.

Some address books also store additional information about users, such as telephone numbers, mailing addresses, job titles, and other information that is more or less unrelated to electronic messaging. Such an address book is often referred to as a "contact manager," as a user is capable of using the address book to maintain a wide variety of information about many different people (referred to in this context as "contacts"). As the use of electronic messaging has become more widespread, many computer users send and receive more electronic messages to and from a larger number of other computer users.

Typically, a user of a prior art contact management software application is required to enter the contact information that they want to store in their address book. A variety of methods exist for entering this contact information. It may be entered manually using a keyboard device, imported from an existing file on their computer, or imported via a peripheral device such as a business card scanner. Unfortunately, often the user does not have a complete set of contact information, and accordingly some contact information fields remain unpopulated when a new contact is added to the address book.

Prior art methods of updating and maintaining contact information databases are known. For example, services such as Internet-Based "White Pages" and E-Mail Directory Services are used to synchronize contact information of locally maintained address books with current contact information stored on a central storage system. Such a service may be used to populate empty contact information fields at some time after a new contact has been added to a local address book. It is a disadvantage of this form of service that each party is required to be a member of the service and that members of the address book, which are not already subscribed, still have to manually inform the subscribed user of their contact information. Furthermore, it is a disadvantage that this form of service requires the contact information to be stored on a central storage system. Although security may be strictly enforced, there are still privacy and security concerns because all personal information is accessible from outside the server.

It would be highly advantageous to provide a method for populating contact information fields for newly added contacts within a contact database absent security concerns, privacy concerns and mandatory subscription to a service by each party within a given contact list.

OBJECT OF THE INVENTION

In an attempt to overcome these and other limitations of the prior art it is an object of the instant invention to provide a method for automatically obtaining additional contact information from a new contact when the new contact is added to an existing contact information database.

In an attempt to overcome these and other limitations of the prior art it is another object of the instant invention to provide a method for automatically populating contact information fields for newly added contacts within a contact database absent security concerns, privacy concerns and mandatory subscription to a service by each party within a given contact list.

SUMMARY OF THE INVENTION

In accordance with the instant invention there is provided a method of adding a new contact to an electronic contact information database comprising the steps of:

a) recognizing data stored in an electronic contact information database of a user system as data relating to contact information of a new contact;

b) extracting from the stored data a contact destination of the new contact;

c) automatically sending a message including a request for additional contact information to the contact destination of the new contact; and d) upon receiving a return message including additional contact information from the new contact, automatically updating the contact information database with the additional contact information.

In accordance with another aspect of the instant invention there is provided a method of adding a new contact to an electronic contact information database of a user system comprising the steps of: using an electronic message application in execution on a system of the new contact, receiving an electronic message transmitted from the user system via a communication network; using an automated reply filter cooperatively in execution with the electronic message application, intercepting the received electronic message prior to storage thereof within an inbox of the electronic message application; parsing information fields within the intercepted electronic message to determine that the electronic message is one of a contact information request message transmitted in dependence upon the new contact being added to the electronic contact information database and another message; generating a new electronic message including data indicative of current contact information for the new contact in reply to a determined contact information request message; providing all other messages for storage within the inbox; and transmitting the generated new electronic message to the user system via the communication network.

In accordance with yet another aspect of the instant invention there is provided method of adding a new contact to an electronic contact information database of a user system comprising the steps of: automatically transmitting an electronic message from the user system to a system of the new contact via a communication network and in dependence upon the new contact being added to the electronic contact information database, the electronic message being identified for interception by an automated reply filter in execution on the system of the new contact; receiving at the user system a new electronic message generated by the automated reply filter in response to the electronic message and transmitted via the communication network, the new electronic message including current contact information retrieved from a memory accessible to the automated reply filter; automatically extracting from the received new electronic message the current contact information for the new contact; and, automatically storing the extracted current contact information in association with other contact information relating to the new contact within the electronic contact information database of the user system.

In accordance with still another aspect of the instant invention there is provided a method of adding a new contact to an electronic contact information database comprising the steps of:

a) storing within an electronic contact information database of a user a new contact having a contact destination; and b) automatically sending a message requesting further contact information to the contact destination of the new contact.

BRIEF DESCRIPTION OF THE DRAWINGS

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which similar reference numbers designate similar items:

FIG. 3 is a schematic illustration of a typical graphical user interface according to the prior art for entering contact information into an address book;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
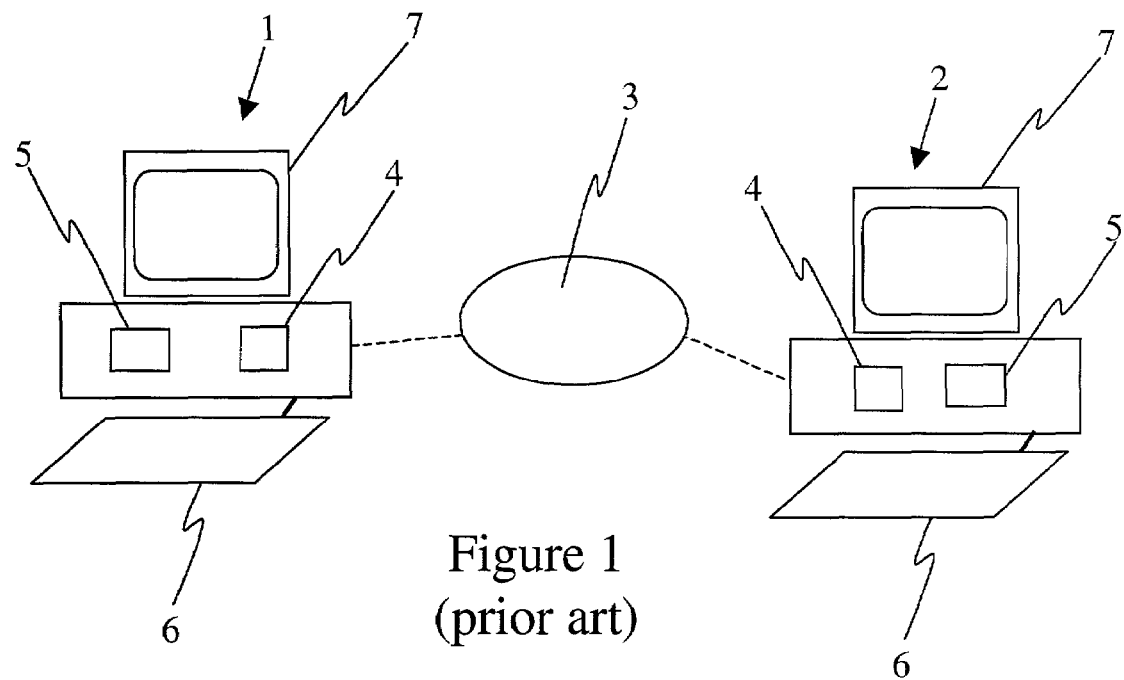
FIG. 1 is a simplified block diagram of a prior art networked computer system.

Referring to FIG. 1, shown is a simplified block diagram of a prior art networked computer system suitable for use with the instant invention. A user system 1 includes a processor 4 for executing code thereon, such as for instance the software code of an electronic messaging application. In communication with the processor 4 is a memory 5 for retrievably storing data thereon, such as for instance an electronic contact information database including contact information for a plurality of contacts. The user system 1 is in communication with a public network 3 such as the Internet for providing a communication medium across which to transmit electronic messages. The user system 1 is connected to the internet via a local area network such as an Ethernet network, through a telephone line using a modem or another communication device, through a cable connection, through a fibre optic connection or through a wireless connection. The user system 1 is provided with a data entry transducer in the form of keyboard 6, and optionally a mouse (not shown). The user system 1 is also provided with a monitor 7. As is shown in FIG. 1, the user system is also in communication with a contact system 2 via the public network 3.

The instant invention will now be described by way of a specific and non-limiting example in which the contact information database is in the form of an electronic address book stored on memory 5 for use with an electronic messaging application when in execution on processor 4 of user system 1. It should be understood, however, that other types of contact information databases are envisaged for use with the method according to the instant invention.

Figure 2:
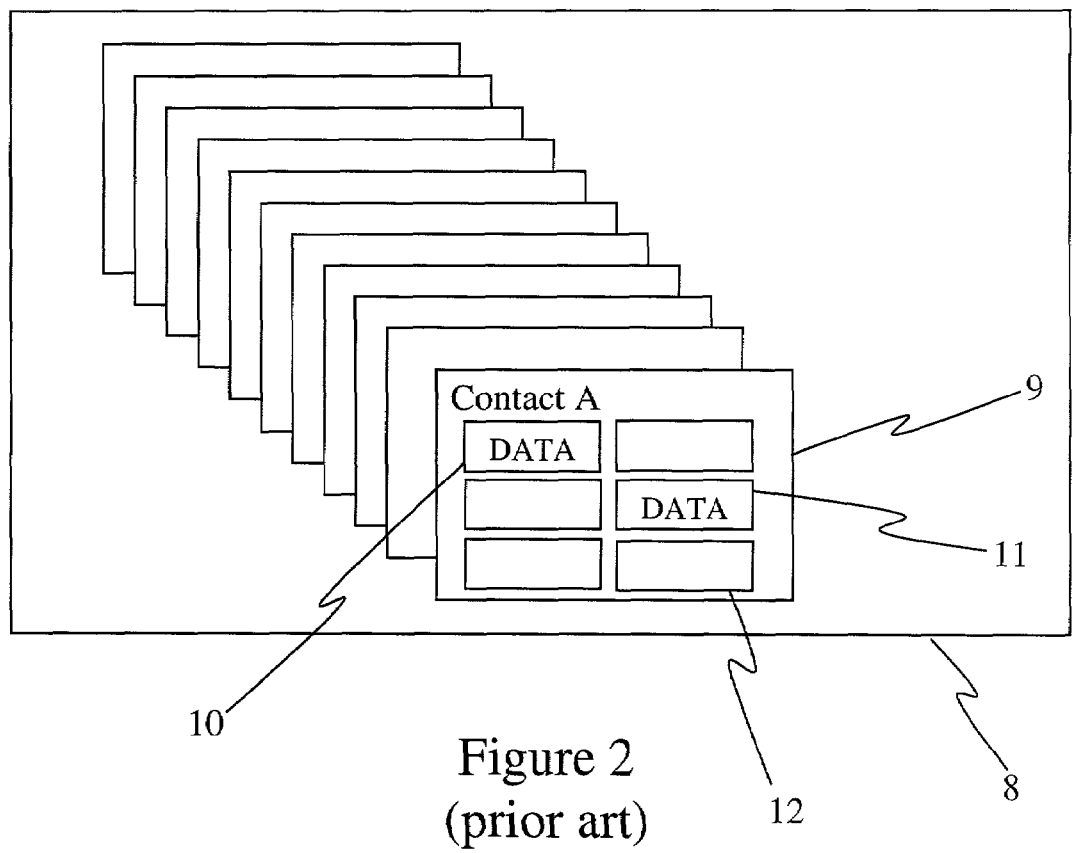
FIG. 2 is a schematic block diagram of a typical prior art address book.

Referring to FIG. 2, shown is a schematic illustration of an electronic address book according to the prior art. A typical address book 8 includes a plurality of contact information records 9, one contact information record for each of a plurality of contacts, wherein different types of contact information relating to each contact is arranged within separate contact information fields. Shown is a contact information record 9 relating to a "Contact A" and including contact information fields such as, for example, an e-mail address field 10, an identifier field 11, a cellular phone number field 12, etc. Often, the user is required only to enter data in the e-mail address field 10 and the identifier field 11 in order to create a new contact information record or a "new contact". The remaining fields are optionally filled in or left empty. In FIG. 2, fields that contain contact information have been identified using the label 'DATA', whilst empty fields are represented as blank rectangles.

Figure 3:
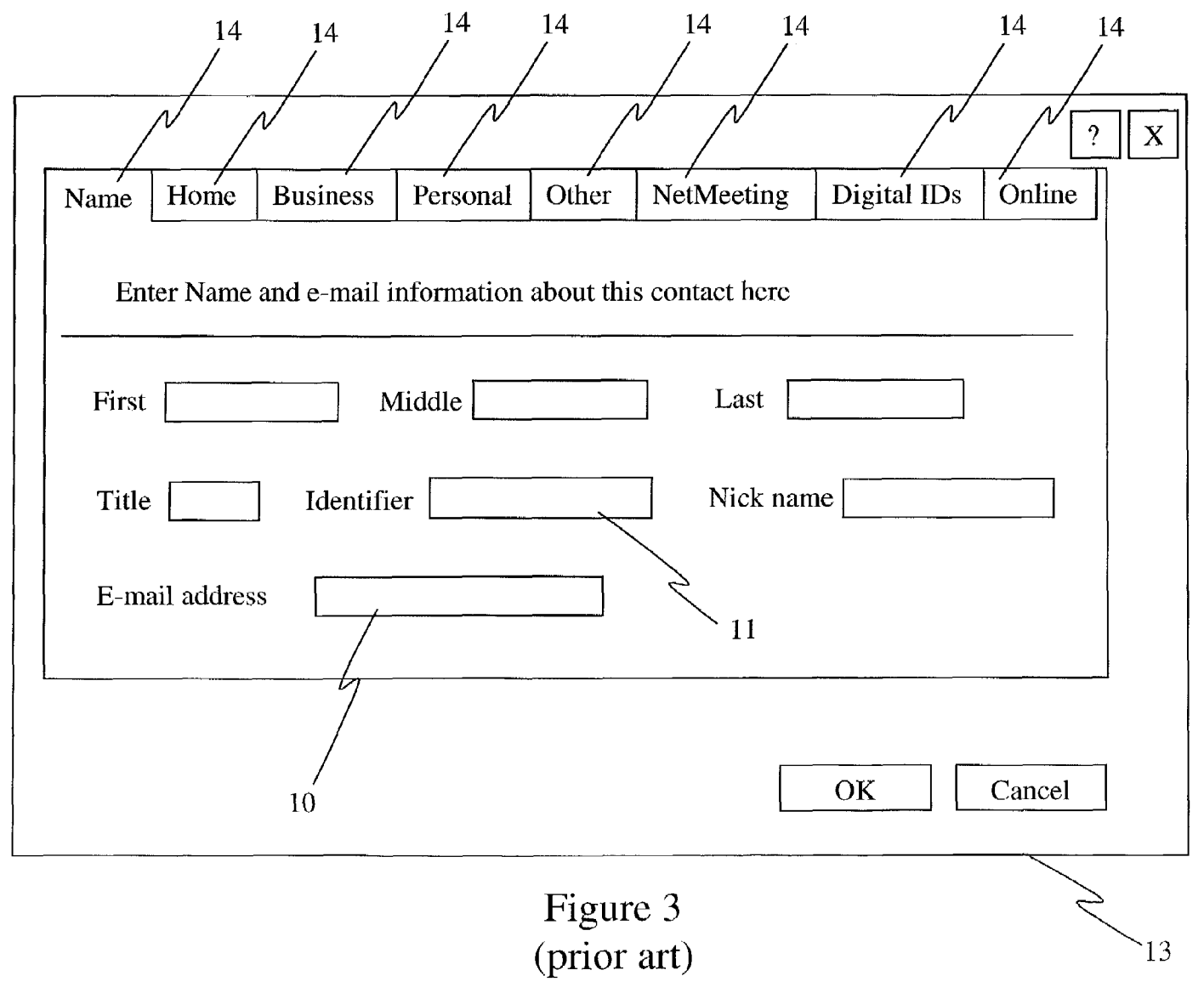

Referring now to FIG. 3, shown is a schematic illustration of a typical graphical user interface for use by a user when manually entering contact information into the address book 8. The interface 13 includes a series of tabs 14 for allowing the user to select different types of information to be entered for the contact including: name; home; business; personal etc. Often, upon receiving an electronic message an electronic messaging application can create a new contact record and automatically enter minimal contact information extracted from the received electronic message. Typically, the extracted contact information is limited to the e-mail address field 10. It then becomes the responsibility of the user to provide any additional contact information that is desired.

Figure 4:
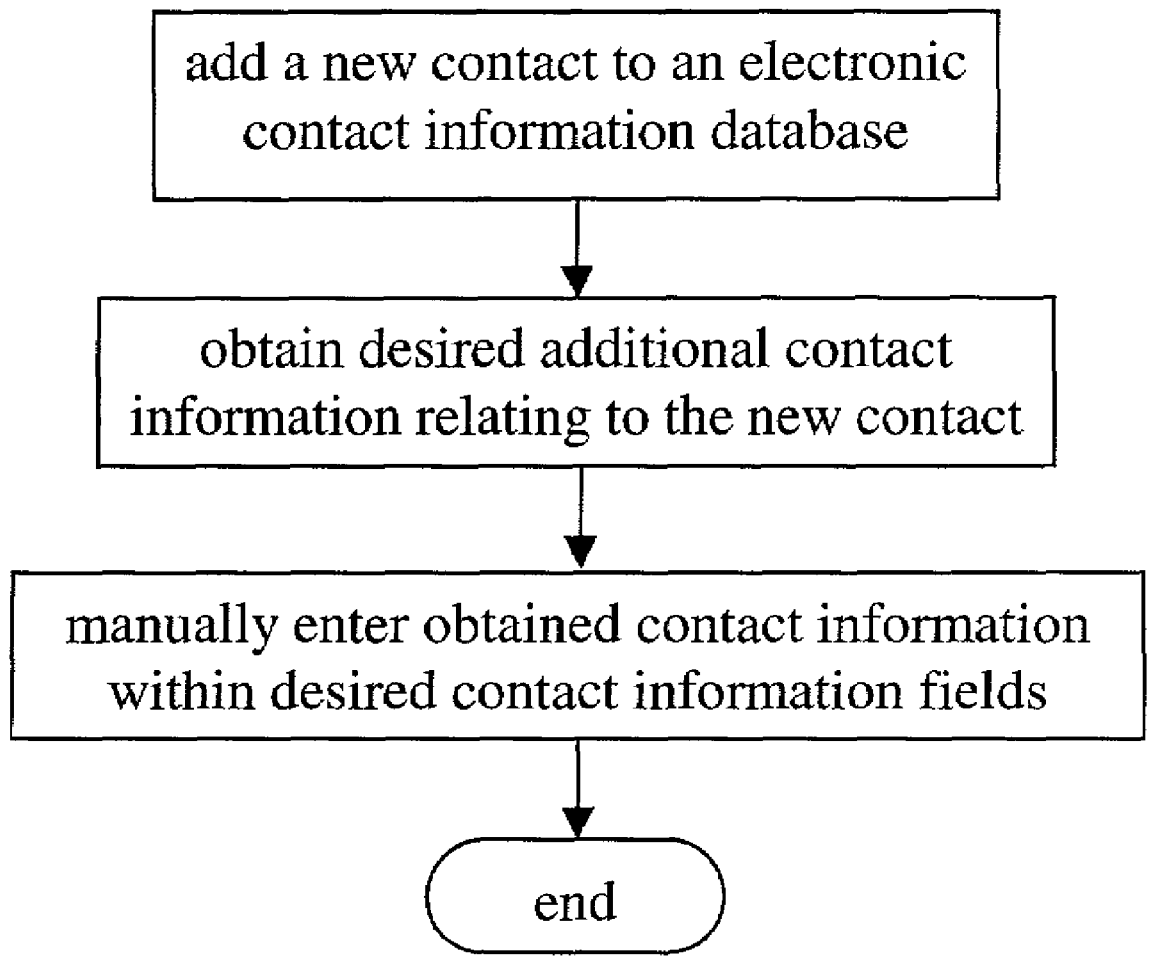
FIG. 4 is a simplified flow diagram of a prior art method of populating contact information fields of a new contact.

Referring again to FIG. 2, often when a new contact is created some fields i.e. 10 and 11 (shaded) are populated immediately, for instance contain data, whilst other fields (unshaded) remain unpopulated, for instance are empty. Most often, the user does not have access to a complete set of contact information at the time a new contact is added to an address book. Of course, the user may desire to have additional contact information fields populated with additional contact information relating to the new contact. Referring now to FIG. 4, shown is a simplified flow diagram of a prior art method of populating additional contact information fields of a new contact within the address book of user system 1. The user adds the new contact to the address book by selecting a command from a toolbar or by otherwise accessing the graphical user interface 13 for entering contact information. Optionally, the new contact is added to the address book after an electronic message is received from the new contact, wherein limited contact information is extracted from the received electronic message. The user then obtains desired additional contact information relating to the new contact, such as for instance by calling the new contact or by reading the information from a business card. Finally, the user manually enters the obtained contact information using a data entry device such as for instance the keyboard 6. Of course, it is the responsibility of the user to verify the accuracy of the obtained information and to ensure that it has been entered correctly into the appropriate field of the contact information data entry interface.

Figure 5:
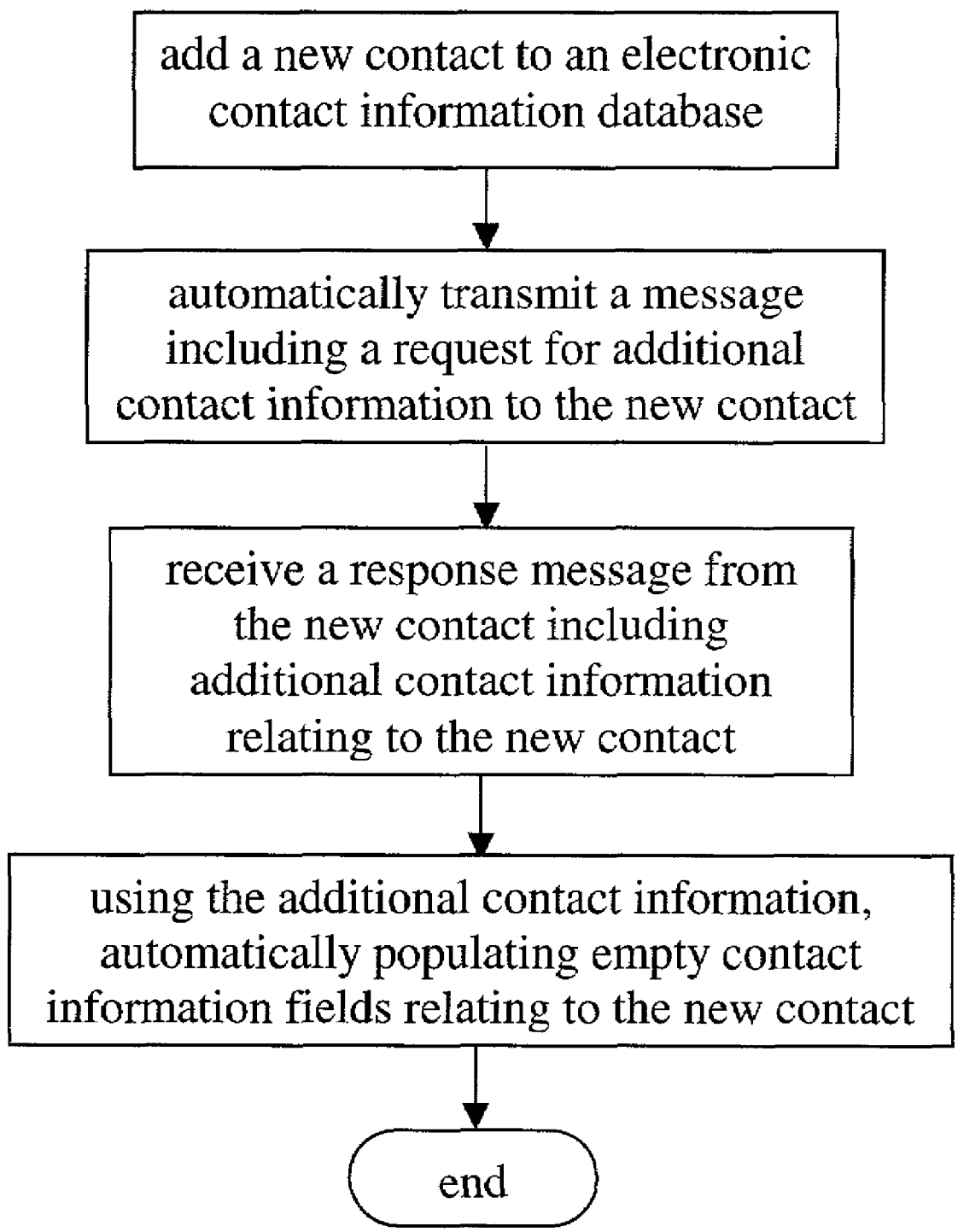
FIG. 5 is a simplified flow diagram of a method of populating contact information fields of a new contact according to an embodiment of the instant invention.

Referring to FIG. 5, shown is a simplified flow diagram of a method according to an embodiment of the instant invention. The method shown in FIG. 5 is for use with a networked computer system, such as for instance the prior art networked computer system described above with reference to FIG. 1. When a contact record 9 is added to an address book 8, an application cooperatively in execution with the electronic messaging application recognizes the added contact record as a new contact record and automatically transmits an electronic message to the new contact, including a request for additional contact information. Preferably, the application extracts a contact destination, such as for instance an e-mail address of the new contact, and automatically transmits the electronic message to the extracted contact destination. The message includes a request asking the new contact to take a look at the contact information entered by the user, make sure the contact information is accurate, correct any inaccurate contact information, and add any additional contact information that is missing. A response message including the additional contact information is generated at the system of the new contact in one of a manual and an automatic manner, and is received at the user system after transmission via the communication network. Then, the application cooperatively in execution with the electronic messaging application automatically populates indicated contact information fields relating to the new contact using the additional contact information.

Figure 6A:
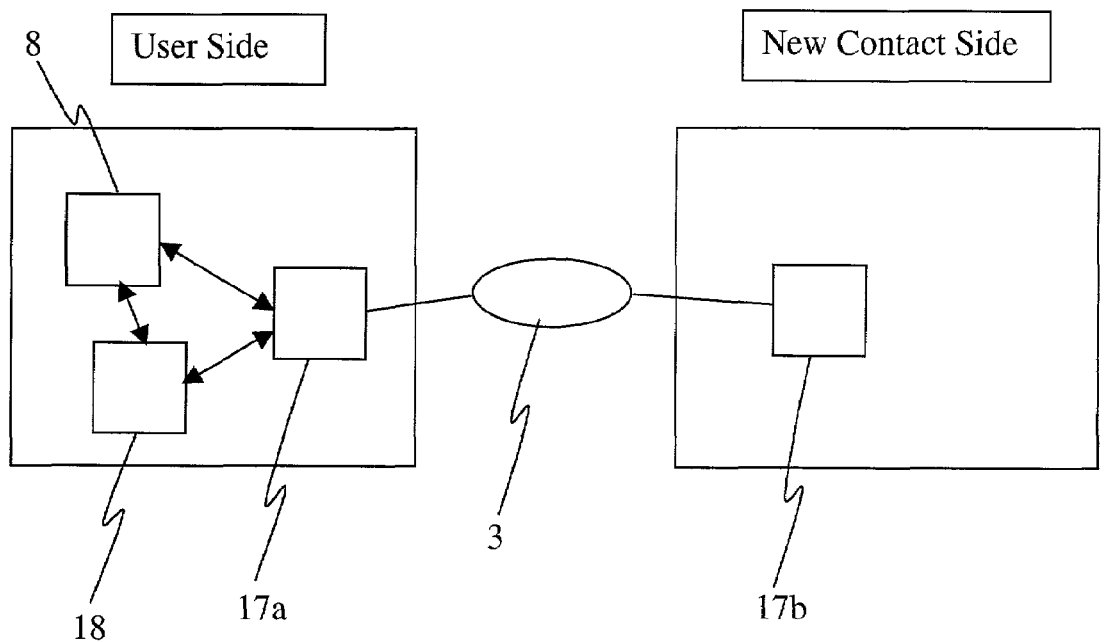
FIG. 6a is a simplified code block diagram in accordance with a first embodiment of the instant invention.
Figure 6B:
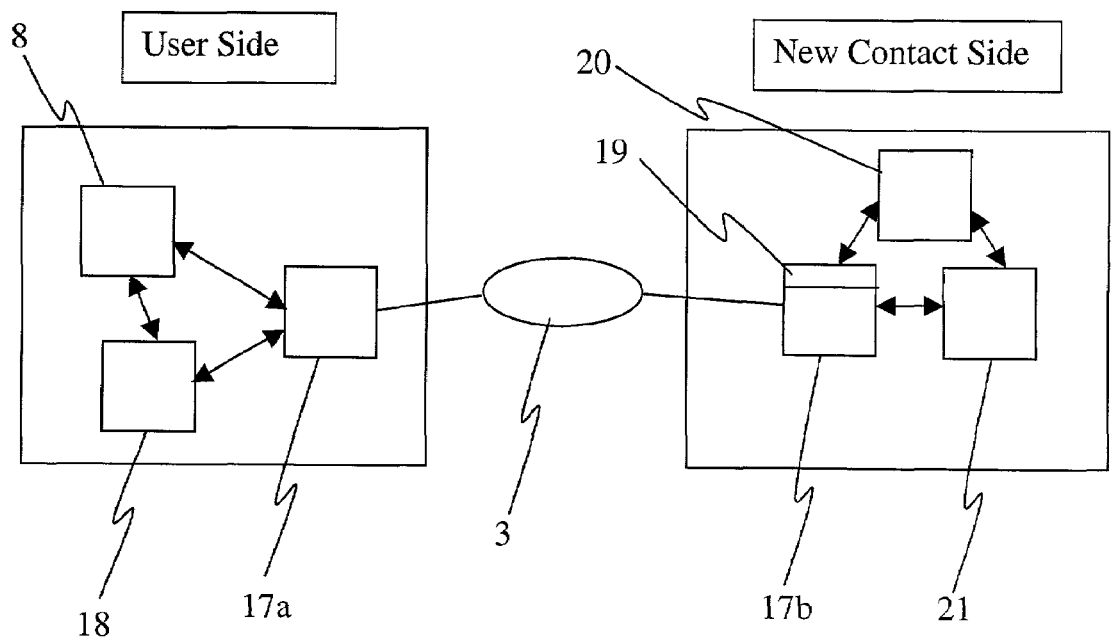
FIG. 6b is a simplified code block diagram in accordance with a second embodiment of the instant invention.
Figure 6C:
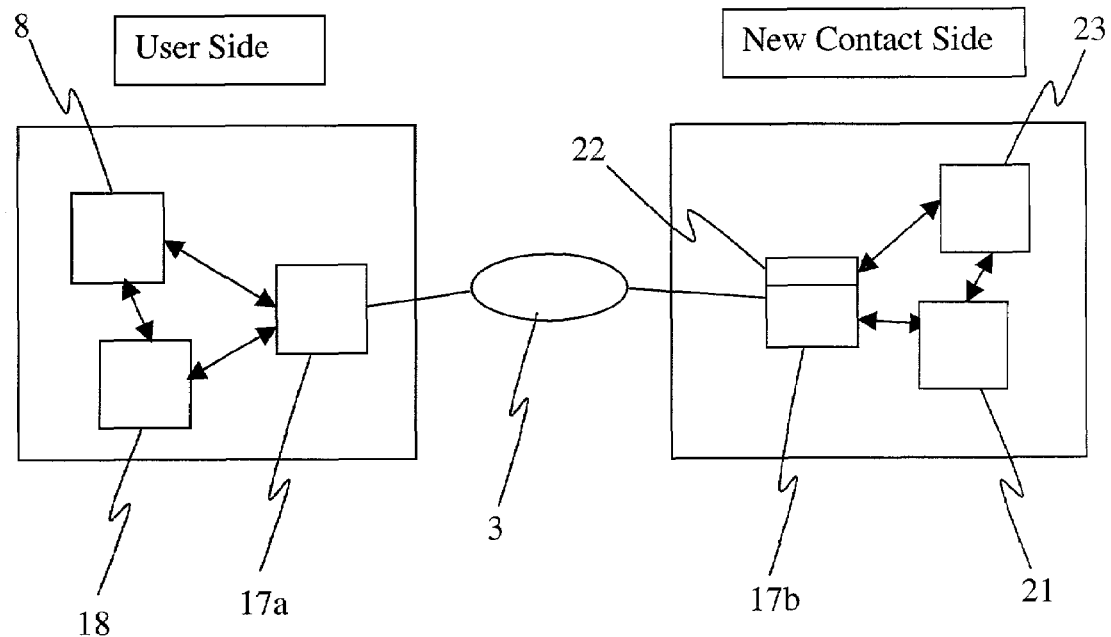
FIG. 6c is a simplified code block diagram in accordance with a third embodiment of the instant invention.

Referring to FIGS. 6a, 6b and 6c, shown are simplified code block diagrams, which represent code in execution on the user side and the new contact side for three embodiments according to the instant invention.

Referring to FIG. 6a, shown is a simplified code block diagram according to a first embodiment of the instant invention. When a new contact record 9 is added to the address book 8, for example using an electronic messaging application 17a, then an application 18 cooperatively in execution with the electronic messaging application 17a automatically recognizes the record as relating to a new contact. The application 18 automatically generates and transmits an electronic message via communication network 3 to a system of the new contact. The electronic message is received at the system of the new contact using a compatible electronic messaging application 17b in execution thereon. Upon receiving the automated message, the new contact manually reviews the data included in the message, adds any data that is missing, corrects any data that is inaccurate, and transmits a response message to the user system via the communication network 3. The response message is received using the electronic messaging application 17a and passed to the application 18. The application 18 automatically extracts the additional contact information and updates the new contact record in the address book 8. When the new contact fails to respond to the electronic message, the contact information stored in the address book of the user system remains unchanged.

Optionally, the application 18 attaches an electronic tag to the electronic message, wherein the electronic tag is for automatic interception of the tagged electronic message by the electronic messaging application 17b, for manual review by the new contact.

Advantageously, the new contact decides whether or not to provide additional contact information to the user. Of course, optionally the new contact provides only some of the additional contact information requested based on the type of user making the request for additional contact information. For instance, if the user were a known personal acquaintance of the new contact then the new contact would provide residential contact information. Alternatively, if the user were a major client of the new contact then the new contact would provide residential and professional contact information. Of course, if the user were a minor client of the new contact then the new contact would provide professional contact information only. In each case the new contact decides the type of contact information that is provided.

Referring to FIG. 6b, shown is a simplified code block diagram according to a second embodiment of the instant invention. When a new contact record is added to the address book 8, for example using an electronic messaging application 17a, then an application 18 cooperatively in execution with the electronic messaging application 17a automatically recognizes the record as relating to a new contact. The application 18 automatically generates and transmits an electronic message via communication network 3 to a system of the new contact. The electronic message is received at the system of the new contact using a compatible electronic messaging application 17b in execution thereon. Upon receiving the automated message the new contact manually accepts or declines the request. For example, a filter 19 intercepts the received message determines that the message is one of a request for contact information and an other message. All other messages are directed to an inbox (not shown) of the electronic messaging application. All request for contact information messages are provided to an application 20. The application 20 prompts the new contact to accept or decline the request. When the new contact declines the request, the application generates a first response message for transmission to the user system and including an indication that the new contact does not wish to provide additional contact information. The contact information stored in the address book of the user system remains unchanged. Optionally, the new contact record is updated to include a flag such that future requests for additional information are not sent to the new contact. When the new contact accepts the request for additional contact information, the application 20 automatically prepares a second other response message using current contact information stored in a memory file 21 accessible to the application 20. The response message is transmitted to the user system via the communication network 3. The response message is received using the electronic messaging application 17a and passed to the application 18. The application 18 automatically extracts the additional contact information and updates the new contact record in the address book 8.

Optionally, the application 20 prompts the new contact to select a type of contact information that is to be provided to the user system. For example, the new contact selects an information file from a plurality of information files, each information file including different types of contact information. Accordingly, the new contact may select an information file including residential contact information only when the user is a personal acquaintance, an information file including residential and professional contact information when the user is a major client, and an information file including professional contact information only when the user is a minor client. Advantageously, the new contact controls the distribution of contact information.

Referring to FIG. 6c, shown is a simplified code block diagram according to a third embodiment of the instant invention. When a new contact record is added to the address book 8, for example using an electronic messaging application 17a, then an application 18 cooperatively in execution with the electronic messaging application 17a automatically recognizes the record as relating to a new contact. The application 18 automatically generates and transmits an electronic message via communication network 3 to a system of the new contact. The electronic message is received at the system of the new contact using a compatible electronic messaging application 17b in execution thereon. Upon receiving the automated message a filter 22 intercepts the received message and determines that the message is one of a request for contact information and an other message. All other messages are directed to an inbox (not shown) of the electronic messaging application. All requests for contact information messages are provided to an application 23.

The application 23 automatically prepares a response message using current contact information stored in a memory file 21 accessible to the application 23. The response message is transmitted to the user system via the communication network 3. The response message is received using the electronic messaging application 17a and passed to the application 18. The application 18 automatically extracts the additional contact information and updates the new contact record in the address book 8. Advantageously, the new contact information record of the user address book 8 is updated automatically, absent the new contact being disturbed.

Optionally, the application 18 attaches an electronic tag including information relating to the user. The application 23 categorizes the user according to a set of rules established by the new contact. For instance, the user may be unknown to the new contact or the user may appear in the new contact's address book. If the user is unknown, the application 23 responds according to a predetermined rule, for example the application 23 transmits a response message denying the user's request for additional contact information. If the user appears in the new contact's address book, then the user may be further categorized as, for instance, one of a personal contact, a business contact, a "good" contact, and a "bad" contact. The response message prepared by the application 23 includes current contact information stored in one of a plurality of memory files accessible to the application 23, wherein each different memory file contains a predetermined set of contact information that the new contact is willing to provide in an automated manner to a predetermined category of user.

In each of the embodiments discussed supra the application 18, 20 or 23 is preferably independent of the electronic messaging application 17a or 17b being used.

Figure 7C:
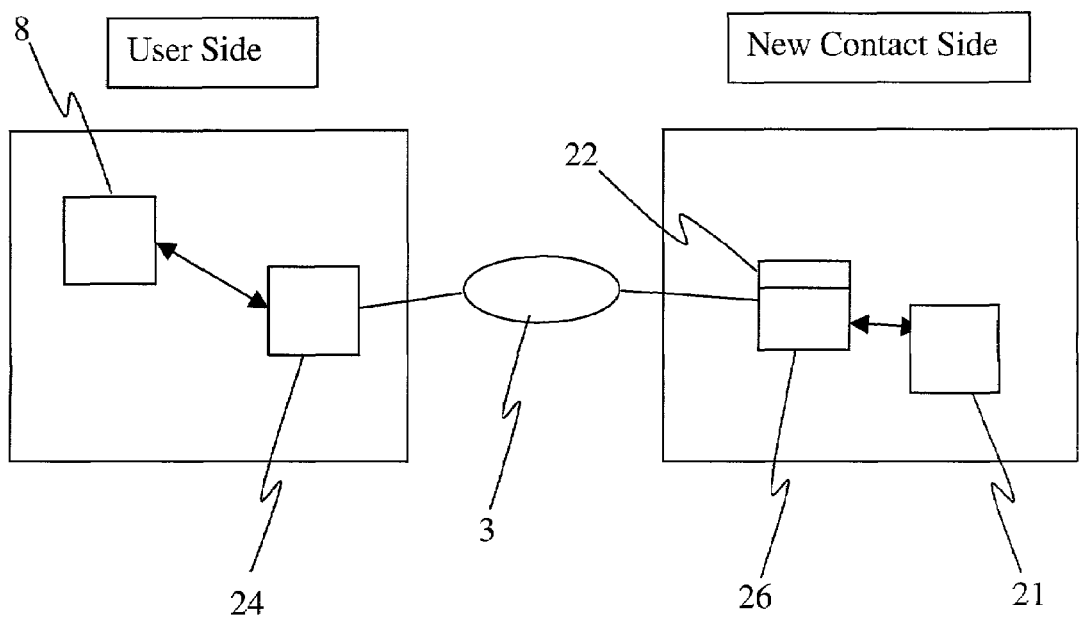
FIG. 7c is a simplified code block diagram in accordance with a sixth embodiment of the instant invention.
Figure 7A:
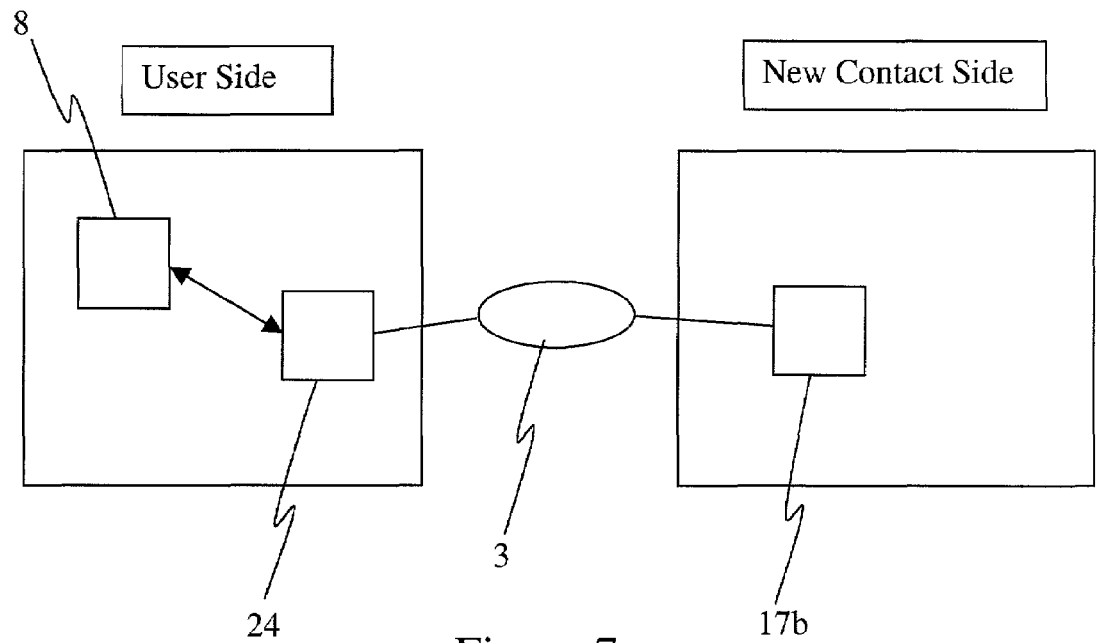
FIG. 7a is a simplified code block diagram in accordance with a fourth embodiment of the instant invention.

Referring to FIG. 7a, shown is a simplified code block diagram according to a fourth embodiment of the instant invention. In the fourth embodiment of the instant invention a single code block 24 replaces the application 18 and the electronic messaging application 17a of the first embodiment.

Figure 7B:
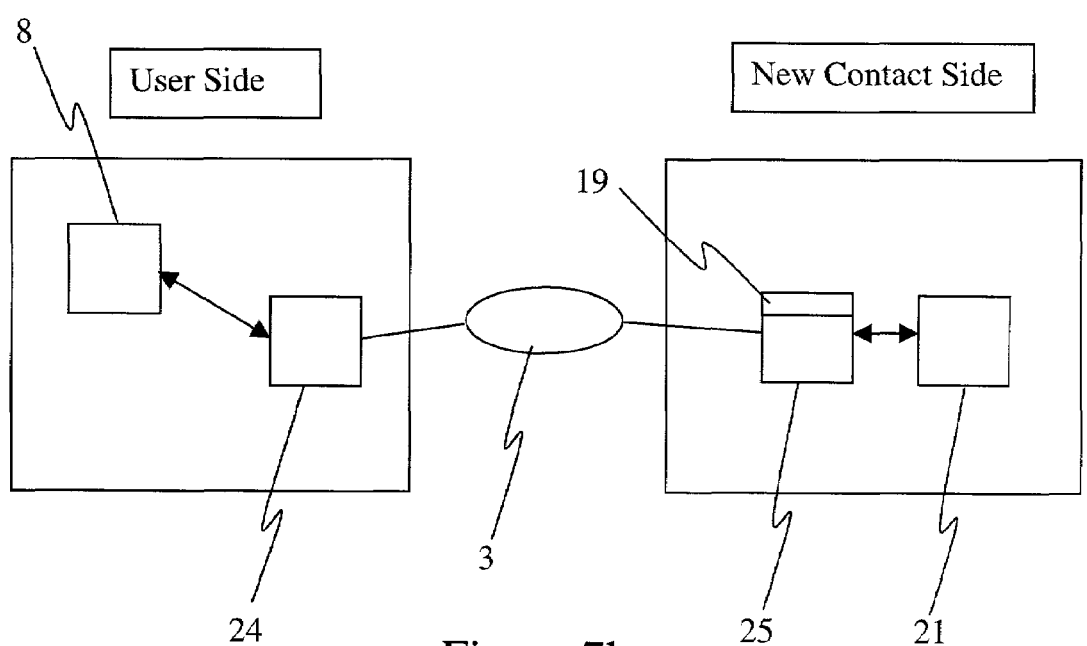
FIG. 7b is a simplified code block diagram in accordance with a fifth embodiment of the instant invention.

Referring to FIG. 7b, shown is a simplified code block diagram according to a fifth embodiment of the instant invention. In the fifth embodiment of the instant invention a single code block 24 replaces the application 18 and the electronic messaging application 17a of the second embodiment. Furthermore, a single code block 25 replaces the application 20 and the electronic messaging application 17b of the second embodiment. Filter 19 intercepts a received message and determines that the message is one of a request for contact information and an other message. All other messages are directed to an inbox (not shown) of the unified application 25. When a determined request for contact information messages is intercepted by filter 19, the unified application 25 prompts the new contact to accept or decline the request.

Referring to FIG. 7c, shown is a simplified code block diagram according to a sixth embodiment of the instant invention. In the sixth embodiment of the instant invention a single code block 24 replaces the application 18 and the electronic messaging application 17a of the third embodiment. Furthermore, a single code block 26 replaces the application 23 and the electronic messaging application 17b of the third embodiment. Filter 22 intercepts a received message and determines that the message is one of a request for contact information and an other message. All other messages are directed to an inbox (not shown) of the unified application 26. When a determined request for contact information messages is intercepted by filter 22, the unified application 26 automatically prepares a response message using current contact information stored in a memory file 21 accessible to the unified application 26.

Figure 8:
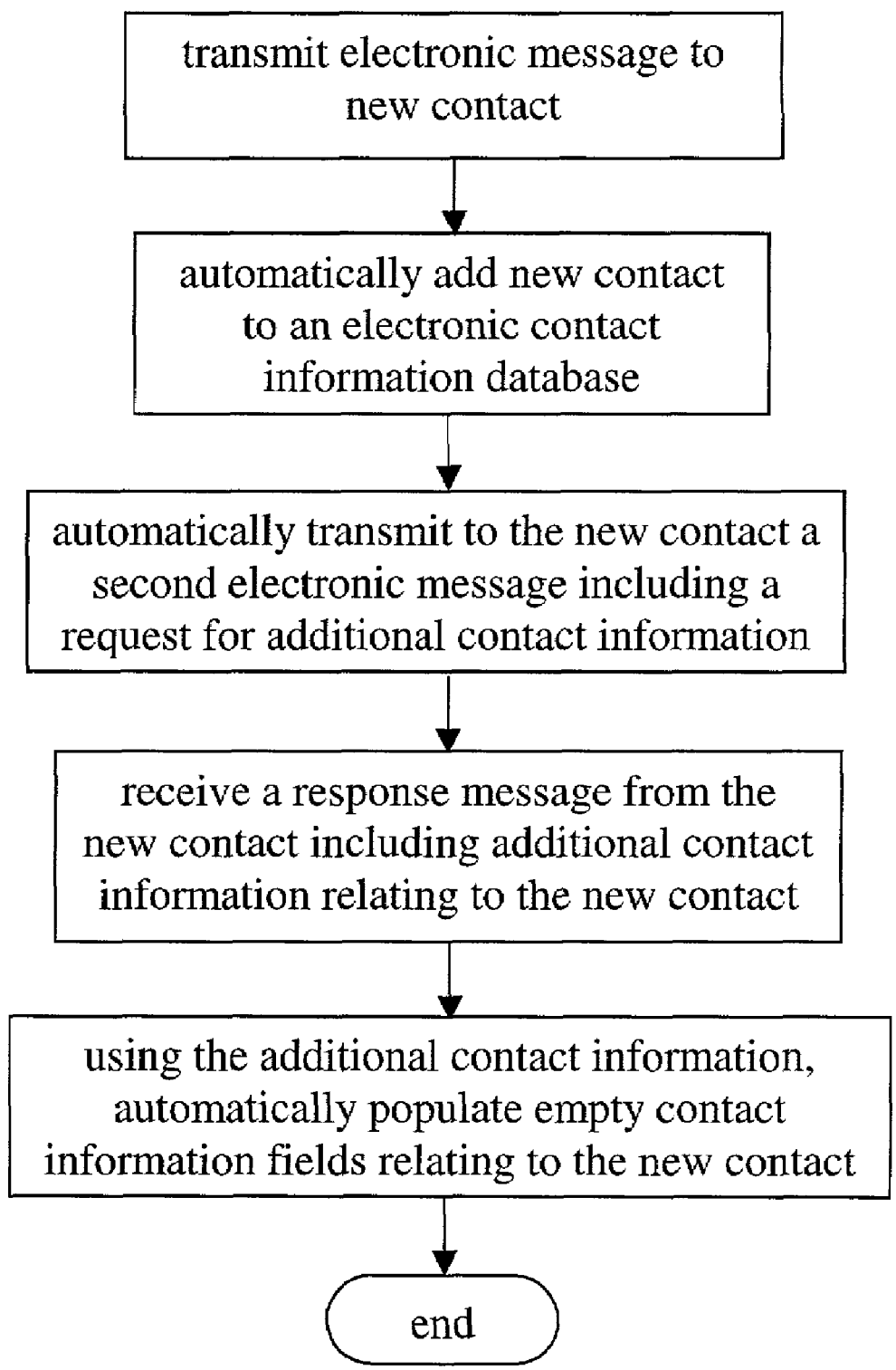
FIG. 8 is a simplified flow diagram of an entirely automated method of populating contact information fields of a new contact according to an embodiment of the instant invention.

Referring to FIG. 8, shown is a method according to another embodiment of the instant invention. The user transmits an electronic message to a new contact. For instance the user creates a new message and specifies an e-mail address of the new contact or the user responds to an electronic message previously transmitted by the new contact. The application executing cooperatively with the electronic messaging application automatically adds the new contact to the address book and transmits a second electronic message, including a request for additional contact information, to the new contact. The second electronic message includes a request asking the new contact to take a look at the contact information entered by the user, make sure the contact information is accurate, correct any inaccurate contact information, and add any additional contact information that is missing. A response message including the additional contact information is generated at the system of the new contact in one of a manual and an automatic manner, and is received at the user system after transmission via the communication network. Then, the application cooperatively in execution with the electronic messaging application automatically populates indicated contact information fields relating to the new contact using the additional contact information.

Advantageously, the user address book is neither provided to nor stored on a central storage system, such as for instance a central database of a computer system remote to the user system. The address book always remains on the user system, and accordingly the user data is secure since the data is not provided to any central authority.

Optionally, the user customizes the electronic message such that it is very clear that the email comes from the user and not an unauthorized third party. For example, the user writes the subject header and the message. Furthermore, the new contact can be assigned to a group selected from a plurality of different group, wherein a different message is sent to new contacts in each of the plurality of different groups.

Numerous other embodiments may be envisaged without departing from the spirit and scope of the invention.

What is claimed is:

1. A method of adding a new contact to an electronic contact information database comprising the steps of:
   a) using an application in execution on a user system, recognizing data stored in an electronic contact information database of the user system as data relating to contact information of a new contact;
   b) extracting from the stored data a contact destination of the new contact;
   c) automatically sending a message including a request for additional contact information to the contact destination of the new contact; and
   d) upon receiving a return message including additional contact information from the new contact, automatically updating the contact information database with the additional contact information.

2. A method according to claim 1 wherein the stored data is provided manually by a user of the user system.

3. A method according to claim 1 wherein the stored data is provided automatically by an electronic message application in execution on the user system.

4. A method according to claim 1 wherein the message is an electronic message and wherein step d) includes the step of:
   automatically extracting the additional contact information from the received return message.

5. A method according to claim 4 wherein a user of the user system is a subscriber to a contact list update service and wherein the new contact is other than a subscriber to the contact list update service.

6. A method according to claim 5 comprising the steps of:
   verifying the authenticity of each electronic message received at a system of the new contact.

7. A method according to claim 6 wherein the electronic message comprises message body text containing contact information for at least one contact information field for verification.

8. A method according to claim 6 wherein the return message is generated by an automated reply filter in execution on the contact system using contact information retrieved from a memory accessible to the automated reply filter.

9. A method of adding a new contact to an electronic contact information database of a user system comprising the steps of:
   using an electronic message application in execution on a system of the new contact, receiving an electronic message transmitted from the user system via a communication network;
   using an automated reply filter cooperatively in execution with the electronic message application, intercepting the received electronic message prior to storage thereof within an inbox of the electronic message application;
   parsing information fields within the intercepted electronic message to determine that the electronic message is one of a contact information request message transmitted in dependence upon the new contact being added to the electronic contact information database and another message;
   generating a new electronic message including data indicative of current contact information for the new contact in reply to a determined contact information request message;
   providing all other messages for storage within the inbox; and
   transmitting the generated new electronic message to the user system via the communication network.

10. A method according to claim 9 wherein the new electronic message is generated by the automated reply filter using contact information retrieved from a memory accessible to the automated reply filter.

11. A method according to claim 10 absent a step of storing the received electronic message within the inbox.

12. A method according to claim 9 comprising the steps of:
   receiving the transmitted new electronic message at the user system;
   automatically extracting from the received new electronic message the current contact information for the new contact; and,
   automatically storing the extracted current contact information in association with other contact information relating to the new contact within the contact database of the user system.

13. A method of adding a new contact to an electronic contact information database of a user system comprising the steps of:

automatically transmitting an electronic message from the user system to a system of the new contact via a communication network and in dependence upon the new contact being added to the electronic contact information database, the electronic message being identified for interception by an automated reply filter in execution on the system of the new contact;

receiving at the user system a new electronic message generated by the automated reply filter in response to the electronic message and transmitted via the communication network, the new electronic message including current contact information retrieved from a memory accessible to the automated reply filter;

automatically extracting from the received new electronic message the current contact information for the new contact; and, automatically storing the extracted current contact information in association with other contact information relating to the new contact within the electronic contact information database of the user system.

14. A method of adding a new contact to an electronic contact information database comprising the steps of:

a) storing within an electronic contact information database of a user a new contact having a contact destination;

b) automatically sending a message requesting further contact information to the contact destination of the new contact; and, c) upon receiving a return message with further contact information from the new contact, automatically extracting the further contact information from the received return message and automatically updating the contact information database with the further contact information, wherein the user is a subscriber to a contact list update service and wherein the new contact is other than a subscriber to the contact list update service.

* * * * *